Patented Oct. 12, 1954

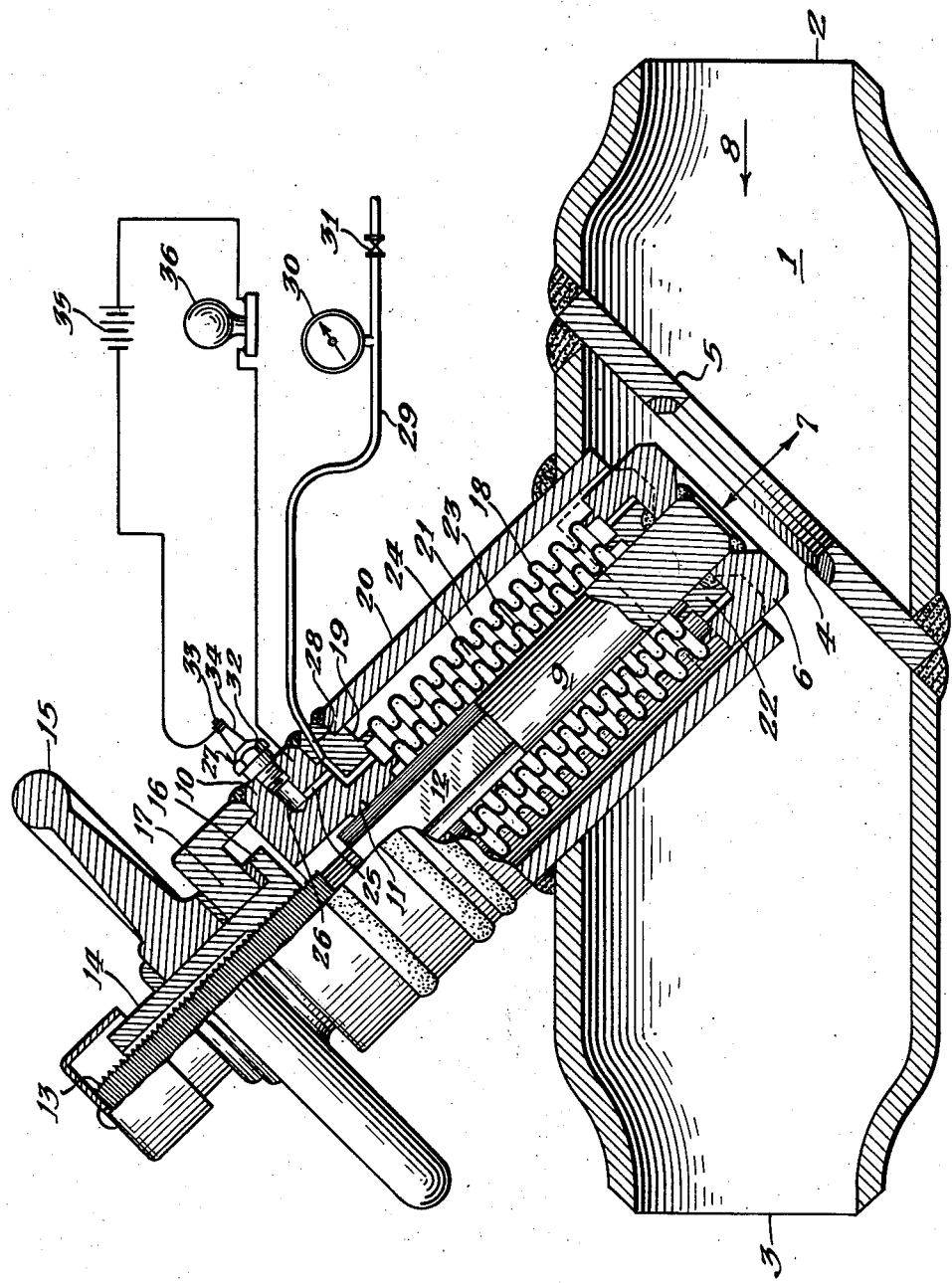

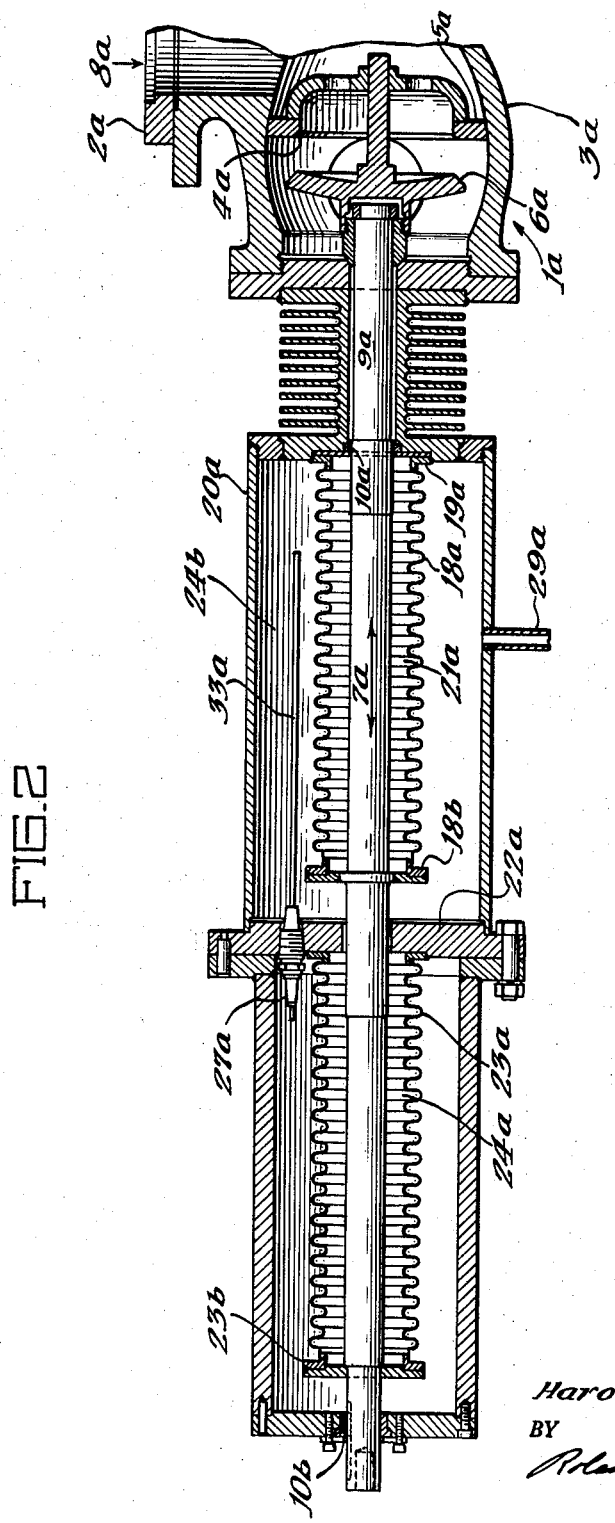

2,691,773

UNITED STATES PATENT OFFICE 2,691,773

VALVE LEAK DETECTOR

Harold V. Lichtenberger, Idaho Falls, Idaho, assignor to the United States of America as represented by the United States Atomic Energy Commission Application July 23, 1951, Serial No. 238,061

1 Claim. (Cl. 340—242)

This invention relates to fluid systems and more particularly to means and methods for introducing translational motion into a fluid system.

A principal object of the invention is to introduce this type of motion while maintaining a tight seal, and thereby reducing to a minimum the possibility of leakage, i. e. essentially to positively prevent the loss of even minute quantities of fluid, either gaseous or liquid, from the system when the motion is introduced, when the system is operated at a high or supra-atmospheric pressure.

A second object is to provide means to positively prevent the introduction of small traces of the ambient atmosphere into a system, if the system is operated at low or sub-atmospheric pressures, as for example, in vacuum systems wherein the maximum pressure is frequently of the order of a few millimeters to a few thousandths of a millimeter of mercury absolute, or less.

A further object of this invention is to provide a flexible seal which, in the event of failure of any of the components thereof, permits the easy detection of the failure while maintaining completely uninterrupted closure of the system.

These and other objects are accomplished by the invention as will become apparent from the following description taken in connection with the drawings, wherein:

Fig. 1 is the vertical sectional view partially in elevation of a valve, and,

Fig. 2 is a vertical sectional view partially in elevation, of a valve showing a different embodiment of the invention.

For purposes of illustrating the principles of this invention, two examples in the form of valves in fluid systems operating at pressures in excess of atmospheric have been selected. Specifically, the description will be limited to fluids which are electrically conducting liquids as, for example, liquid metals, liquid metal alloys, electrically conducting aqueous solutions and the like.

Referring to Fig. 1, in the first embodiment of the invention a valve body shown generally at 1 is adapted to be inserted into a fluid carrying pipe by welding thereto at ends 2 and 3 to form rigid leak-proof connections wherein is transported the fluid, either gaseous or liquid, at supra-atmospheric pressure. A conventional seat 4 is placed in a plate 5 which traverses the cross sectional area of the valve body 1. A usual valve plug 6 is provided, which, by translational motion along the axis 7, moves into the valve seat 4 thereby reducing or completely shutting off the flow of fluid proceeding, for example, in the direction 8 through the valve.

The plug 6 is attached to the shaft by welding, for example, and the shaft 9 in turn slides in guide 10 through a passage 11 which serves to confine its motion to the axis 7. In the particular embodiment chosen, rotation of the valve plug 6 is restrained by forming the shaft 9 into a hexagonal cross section as shown generally at 12 and shaping the passage 11 to conform thereto with suitable clearance to permit easy sliding of shaft 9 through the guide 10. The upper portion of shaft 9 is provided with threads 13, and a circular nut 14, rigidly attached to a wheel 15, is threaded thereon. Nut 14 is equipped with a flange 16 which cooperates with the wheel 15 and cap 17 rigidly attached to guide 10 to prevent any possible translation of the nut 14, and permitting only rotation.

Attached to the plug 6, for instance, by welding, is a flexible bellows 18, the other end of which is similarly attached to a collar 19. The collar 19 is rigidly fixed to the tube 20 on one side and to the guide 10 on the other, while the tube 20 in turn is mounted in a rigid leak-proof manner to the main body of the valve 1. It is thus clear that a fluid within the main body of the valve when the valve is in the open position will have access to the volume 21 as defined by the bellows 18, the collar 19, and the supporting tube 20.

A ring 22 is attached to the shaft 9 in a suitable manner so as to be completely leak-proof, for instance, by welding. A second bellows element 23 is attached to ring 22 and to the guide 10 in the same manner as the first bellows element 18. It is therefore clear that a completely enclosed volume 24 is confined between the two bellows 18 and 23, the ring 22, the plug 6, the guide 10, and the collar 19. In the event that the ring 22 is spaced along the shaft 9 from the plug 6, a closed volume is likewise still obtained. Communicating with this volume 24 is a port 25 which connects to a chamber 26 adapted to receive a spark plug 27. Also communicating with the volume 24 is a second port 28 connected to a tube 29 which is provided with a pressure gauge 30 and a shut-off valve 31.

The spark plug 27 is provided with a main body 32 and a central probe 33 supported and sealed therein by a suitable insulator 34, the probe 33 passes completely through the insulator 34 into the chamber 26. Attached to the probe 33 exteriorly is a battery 35 by means of a suitable electrical conductor, and this, in turn, to an electric light 36. The electric light is in turn attached to a portion of the valve body or any part electrically connected thereto like the guide 10.

In operation, the liquid flows in the direction 8 in the event that the valve is open, i. e. that the plug 6 is spaced from the seat 4, thereby permitting the liquid to flow through the annular region therebetween. If it is desired to shut off the flow of liquid, wheel 15 is rotated in the proper direction, that is, counter-clockwise, if the thread 13 is a right hand thread. The wheel 15 in turn carries with it the nut 14 and by means of the threaded relation between the nut 14 and the shaft 9 produces a downward displacement thereof until the plug 6 is firmly engaged with the seat 4, at which point all flow of liquid through the valve ceases. Clock-wise rotation of the wheel 15 serves to reverse the mechanical motions described, thereby removing the plug 6 from engagement with seat 4, and permitting the flow of liquid. Quite clearly, the interruption of liquid flow in either direction may be controlled, although in this instance the preferred direction is that designated at 8.

With the type of construction described hereabove, it follows that sealing is accomplished without the use of packing glands, labyrinth glands, Wilson seals and the like which are generally characterized by a sliding fit between the movable member and a stationary part of the system envelope which contains the liquid. Such seals depend upon either a long leakage path of small cross sectional area, or a friction fit between the surfaces, to impede the flow of liquid or gas. In contrast, the present invention completely avoids this type of sealing means and provides a type of seal or closure which may be called a positive seal, in view of the fact that there is no possible path by which fluid may either enter or leave the system without rupturing or breaking same.

In the event of failure of either of the flexible members, 18 or 23, provision has been made to detect such failure, to enable the determination of which element has failed, and also to simultaneously maintain the complete continuous closure of the system.

It is, of course, well known that under repeated loadings and unloadings, virtually all structural materials will ultimately fail through fatigue stresses, creep and similar phenomena which arise through the repeated application of external forces or displacements. In the device disclosed, repeated opening and closing of the valve may, after a sufficiently larger number of cycles, produce failure in bellows 18. In order to detect possible leakage therethrough, the chamber 24 may be filled with a suitable gas at a pressure in excess of atmospheric through the valve 31, the pressure being measured by the gauge 30. The gauge 30 may also be used for continuously monitoring the gas pressure in the chamber 24 visually, or may be made to actuate a suitable alarm mechanism (not shown). Suitable monitoring may also be accomplished by substantially evacuating the chamber 24, again by means of valve 31, and monitoring the state of the vacuum with a suitable vacuum gauge 30.

It may happen, however, that the first bellows element to fail under repeated operation is the innermost bellows 23. If the liquid in the valve body 1 is maintained at a higher pressure than that established in the chamber 24, the conduction liquid will flow through the leak and ultimately reach a level sufficient to establish electrical contact with the probe 33, thereby electrically connecting it to the guide 10, permitting current to flow through the action of the battery 35 and illuminating the lamp 36, or inducing operation in any other sort of electro-sensitive device adapted to operate an alarm or indicator. In order to permit the conducting liquid to fill the volume 24 to a sufficient extent to contact probe 33, it is necessary that the pressure in the chamber 24 be less than that in the valve body 1 and different from that prevailing in the atmosphere. The preferred pressure in the chamber is intermediate between these two limits although evacuation will operate satisfactorily. It is also important that the tubing 29 have sufficient free volume to allow the gas in chamber 24 to be compressed therein without raising the pressure to a value exceeding that prevailing in valve body 1.

Having described one embodiment of this invention, a second is shown in Fig. 2. In view of the fact that both embodiments apply to valves corresponding parts in Fig. 2 are enumerated with the same numbers as in Fig. 1 but with the distinguishing small "a" applied thereto.

As in the first embodiment, the valve body shown generally at 1a, is provided with suitable connecting ends 2a and 3a which provide either a standard flange joint or a welded joint to a pipe carrying the conducting liquid. At seat 4a is shown in a barrier or plate 5a with slightly altered design than in the first embodiment but it accomplishes the same purpose. Closing of the valve is obtained when the plug 6a is moved along the axis 7a into contact with the seat 4a, thereby shutting off liquid entering in the direction 8a. The plug 6a is carried on a shaft 9a which is constrained by the two guides, 10a and 10b. Since the actual manner of producing motion in the shaft 9a does not form an important part of this invention, it has been omitted in the second embodiment. Bellows element 18a is attached to a flange 19a which is attached to a closure assembly 20a forming an exterior part of the valve. The other end of the bellows 18a is attached by means of a suitable flange arrangement 18b which in turn is attached to the shaft 9a thereby providing volume 21a which is positively sealed but to which the liquid in the system has access by virtue of leakage through the guide 10a.

The ring 22a is attached to the tube 20a preferably by welding and serves as a mount for one end of the second bellows element 23a which is attached thereto with a positive seal. The other end of the bellows element 23a is in turn connected to the shaft 9a by a second flange arrangement 23b.

There is thereby formed a closed volume 24a comprising a portion 24b within the tube 20a and that included within the bellows 23a.

An accumulation of conducting liquid in the volume 24b can be detected by the usual spark plug arrangement 27a, except that in this embodiment, the probe 33 is made quite long to extend toward the bottom of the chamber 24b, it being understood that the valve design selected in the second embodiment is for a valve wherein the shaft 9a is approximately vertical. Provision for monitoring gas pressure in the volume 24a and 24b may be had by means of tubing 29a connected to suitable pressure monitoring means (not shown) as outlined in the first embodiment.

In operation, it is clear that the valve shown in Fig. 2 functions substantially in the same manner as that in Fig. 1, the shaft 9a being displaced along the axis 7a by means of a suitable drive mechanism (not shown) to affect throttling or complete stopping of the flow of liquid through the valve body 1a. In the event of failure of the first bellows element 18a, the conducting liquid which normally may be expected to occupy the volume 21a, will flow into the volume 24b until it will contact the probe 33a, at which time suitable detecting or alarm devices (not shown) will be caused to operate.

On the other hand, it is apparent that failure of the bellows element 23a will produce a change in gas pressure as recorded or indicated by suitable means (not shown) attached to the tubing 29a.

It is now evident that in the second embodiment as shown in Fig. 2, it is possible to introduce translational motion by way of the shaft 9a from the outside into a closed liquid system by means of positive seals while simultaneously providing suitable monitoring means to detect possible failure of the bellows or the formation of leaks therein.

The invention has been described as applied to a valve since valves are quite commonly applied to and form important components in fluid systems. This in no way is to be construed as a limitation on the scope of the invention.

The problem of introducing motion into a closed fluid system in a substantially leak proof manner has broad applications to many processes, and the description of the embodiment thereof in a valve is intended merely as a convenient illustration. It is recognized that modifications may be made without departing from the intended scope of the invention.

What is claimed is:

A device for use in a system for fluid at above atmospheric pressure comprising a first flexible member forming at least a part of a continuous and positively sealed barrier separating said fluid system from the outside atmosphere, a second flexible member forming at least a part of a continuous and positively sealed barrier separating said fluid system from said first flexible member and spaced therefrom to form a chamber therebetween, means for supplying gas to the chamber at a pressure intermediate that of the liquid and that of the atmosphere, means responsive to gas pressure in the chamber for indicating a leak at the second flexible member resulting in escape of gas from the chamber to the atmosphere and reduction of gas pressure in the chamber, and means responsive to the presence of fluid from said system in the chamber for indicating a leak at the first flexible member.

References Cited in the file of this patent

UNITED STATES PATENTS

| Number | Name | Date |
|---|---|---|
| 1,032,971 | Van Ness | July 16, 1912 |
| 1,844,553 | Barlow | Feb. 9, 1932 |
| 2,134,072 | Christensen | Oct. 25, 1938 |
| 2,230,961 | Lewis | Feb. 4, 1941 |
| 2,382,235 | Lamar | Aug. 14, 1945 |
| 2,416,570 | Coleman | Feb. 25, 1947 |
| 2,495,081 | Thomas | Jan. 17, 1950 |
| 2,501,800 | Wales | Mar. 28, 1950 |